US012697925B2

(12) United States Patent　　(10) Patent No.:　US 12,697,925 B2

Clarke et al.　　(45) Date of Patent:　　　Aug. 4, 2026

(54) VEHICLE OPERATING MODE FOR AN OPEN VEHICLE TAILGATE EVENT

(71) Applicant: Jaguar Land Rover Limited, Coventry (GB)

(72) Inventors: Daniel Clarke, Coventry (GB); Callum Hubbard, Warwick (GB); Martin Lukwasa, Coventry (GB); Gavin Jones, Coventry (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 114 days.

(21) Appl. No.: 18/685,167

(22) PCT Filed: Aug. 18, 2022

(86) PCT No.: PCT/EP2022/073046

§ 371 (c)(1),
(2) Date: Feb. 20, 2024

(87) PCT Pub. No.: WO2023/021127

PCT Pub. Date: Feb. 23, 2023

(65) Prior Publication Data

US 2024/0391395 A1　　Nov. 28, 2024

(30) Foreign Application Priority Data

Aug. 20, 2021　　(GB) ...................................... 2111942

(51) Int. Cl.
*H04B 1/00*　　　　　(2006.01)
*B60R 11/02*　　　　(2006.01)
(Continued)

(52) U.S. Cl.
CPC ............ *B60R 11/0217* (2013.01); *H04S 7/30* (2013.01)

(58) Field of Classification Search
CPC ............................... B60R 11/0217; H04S 7/30
(Continued)

(56) References Cited

U.S. PATENT DOCUMENTS 6,389,147 B1　　5/2002　Rush et al.
2001/0054952 A1　12/2001　Desai
(Continued)

FOREIGN PATENT DOCUMENTS

KR　　　20200000693 A　　　1/2020
WO　　　2004103773 A2　　12/2004
WO　　WO-2013167256 A1 *　11/2013　............. B60Q 1/543

OTHER PUBLICATIONS

Extended European Search Report received in related European Application No. 25181889.4, mailed Aug. 25, 2025 (11 pages).
(Continued)

*Primary Examiner* — Ammar T Hamid

(74) *Attorney, Agent, or Firm* — TROUTMAN PEPPER LOCKE LLP; Dustin B. Weeks; Nicholas H. Doss

(57)　　　　　　ABSTRACT

There is provided a method (400), a computer program (308) and a control system (300) for a vehicle (1). The control system comprises one or more controllers (301), wherein the control system is configured to: in a first operating mode (401), control a loudspeaker system (206) of the vehicle to direct audio output into a cabin (3) of the vehicle; and in a second, user-requestable operating mode (402), control the loudspeaker system of the vehicle to direct audio output to a vehicle-rearward location relative to the audio output in the first operating mode, wherein the second operating mode requires a rear tailgate closure (506), (508) of a rear cargo area (2) of the vehicle to be opened.

20 Claims, 3 Drawing Sheets

(51) Int. Cl.
　　*H04S 7/00*　　　　(2006.01)
　　*G10K 11/16*　　　(2006.01)

(58) Field of Classification Search
　　USPC .................................................. 381/86, 71.4
　　See application file for complete search history.

(56) References Cited

U.S. PATENT DOCUMENTS

| | | |
|---|---|---|
| 2004/0091123 A1 | 5/2004 | Stark |
| 2005/0100174 A1* | 5/2005 | Howard .................. H04R 5/04<br>381/86 |
| 2008/0175405 A1 | 7/2008 | Couvillon, IV |
| 2019/0032391 A1 | 1/2019 | Lavoie et al. |

OTHER PUBLICATIONS

International Search Report and Written Opinion corresponding to application PCT/EP2022/073046, dated Feb. 3, 2023, 22 pages.
Combined Search and Examination Report corresponding to application GB2111942.5, dated Jan. 26, 2022, 6 pages.
GB Search Report corresponding to application GB2314311.8, dated Oct. 18, 2023, 3 pages.
GB Search Report corresponding to application GB2314320.9, dated Oct. 18, 2023, 3 pages.

\* cited by examiner

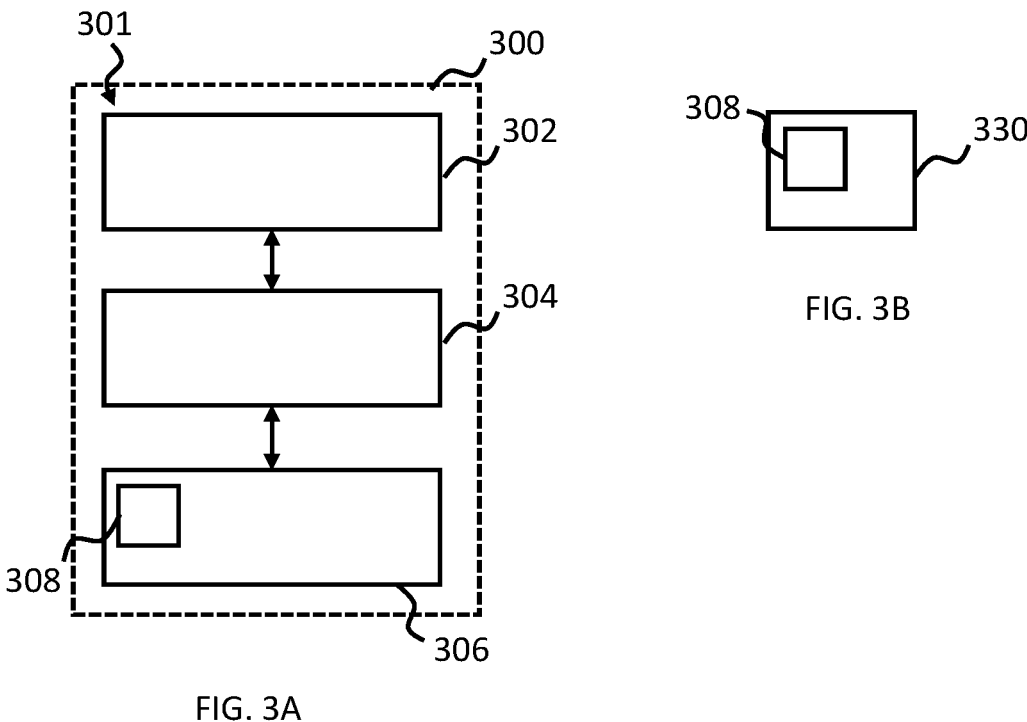
FIG. 3A
FIG. 3B
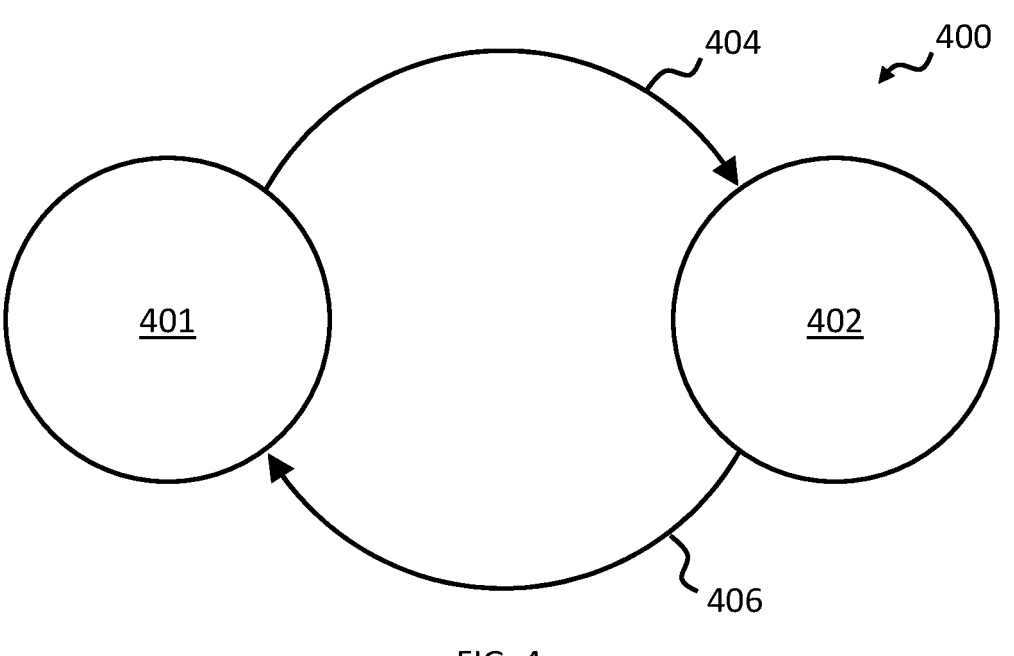
FIG. 4

VEHICLE OPERATING MODE FOR AN OPEN VEHICLE TAILGATE EVENT

TECHNICAL FIELD

The present disclosure relates to a vehicle operating mode for an open vehicle tailgate event. In particular, but not exclusively the vehicle operating mode relates to at least a loudspeaker system of the vehicle. Aspects of the present invention relate to a control system, to a method, to a vehicle, and to computer software.

BACKGROUND

Tailgate parties and similar leisure activities involve users congregating around or occupying rear cargo areas of parked vehicles. Users may listen to music or watch films or sporting events, for example. Some users may utilise vehicle electrical battery power from an auxiliary battery or a high-capacity electrified vehicle battery.

Some users may utilise a loudspeaker system of the vehicle comprising loudspeakers at multiple locations around the vehicle cabin. An always-on loudspeaker mounted in or near the rear cargo area may be useful if the user desires an enhanced listening experience in the rear cargo area. Some users may utilise an electrical socket/receptacle of the vehicle to power their device.

SUMMARY OF THE INVENTION

It is an aim of the present invention to enable users to have an improved vehicle tailgate event experience. The invention is as defined in the appended independent claims.

According to an aspect of the invention there is provided a control system for a vehicle, the control system comprising one or more controllers, wherein the control system is configured to:

in a first operating mode, control a loudspeaker system of the vehicle to direct audio output into a cabin of the vehicle; and in a second, user-requestable operating mode, control the loudspeaker system of the vehicle to direct audio output to a vehicle-rearward location relative to the audio output in the first operating mode, wherein the second operating mode requires a rear tailgate closure of a rear cargo area of the vehicle to be opened.

An advantage is that the vehicle is better equipped for tailgate events. In this aspect, users can receive a good sound quality at reasonable volume levels while congregating at the rear cargo area of the vehicle.

In some examples, directing audio output in the vehicle-rearward direction comprises activating or increasing a sound pressure level of a rear loudspeaker of the loudspeaker system. In some examples, directing audio output to the vehicle-rearward location comprises activating the rear loudspeaker and wherein the rear loudspeaker is inactive in the first operating mode.

In some examples, directing audio output to the vehicle-rearward location comprises deactivating or decreasing a sound pressure level of a forward loudspeaker that is facing the cabin of the vehicle and/or that is in a front area of the cabin. An advantage is reduced energy use because electrical power for driving the forward loudspeakers in the unused cabin is cut. This enables the tailgate event to be powered by a battery of the vehicle for longer, without a need to switch on an engine and increase emission levels adjacent the vehicle cargo area.

In some examples, the rear loudspeaker is a rear tailgate closure loudspeaker configured to be mounted to an interior side of the rear tailgate closure. An advantage is improved audio quality due to line-of-sight acoustic propagation.

In some examples, the control system is configured to, in response to activation of the second operating mode, output a control signal to cause a rear tailgate power mechanism to open the rear tailgate closure, or cause output of a user prompt to request the user to open the rear tailgate closure. An advantage is that the vehicle is better equipped for tailgate events.

In some examples, in the first operating mode, access to the loudspeaker system and/or vehicle cabin microphone by a telephony function is enabled and in the second operating mode access to the loudspeaker system and/or vehicle cabin microphone by the telephony function is inhibited. An advantage is that the vehicle is better equipped for tailgate events because interruptions to a tailgate listening experience are reduced.

In some examples, in the first operating mode a hands-free powered tailgate request function is enabled and in the second operating mode the hands-free powered tailgate request function is inhibited. An advantage is that the vehicle is better equipped for tailgate events because accidental auto-closing is no longer a possibility.

In some examples, in the first operating mode a proximity-based vehicle locking function is enabled and in the second operating mode at least part of the proximity-based vehicle locking function is inhibited. The inhibited part of the function may comprise an audible sound rendering function. An advantage is that the vehicle is better equipped for tailgate events because interruptions to a tailgate listening experience are reduced.

In some examples, the rear cargo area comprises an integrated tailgate seat and/or comprises an attachment point configured to receive a removable tailgate seat. An advantage is that the vehicle is better equipped for tailgate events because users can sit in comfort on an edge of the rear cargo area.

In some examples, the vehicle comprises a rear cargo area lamp that is activatable to illuminate the rear cargo area. An advantage is that the vehicle is better equipped for night time tailgate events.

In some examples, the control system is configured to activate the second operating mode in dependence on a user activation request via an infotainment interface or personal hand-portable computing device.

In some examples, the second operating mode is permitted when an internal combustion engine of the vehicle is inactive but not when the internal combustion engine is active. In some examples, the control system is configured to deactivate the second operating mode in dependence on the monitored energy availability of the battery reaching the depletion limit, without causing engine start to generate additional energy to further extend the second operating mode. An advantage is that the vehicle is better equipped for tailgate events because emissions in the space around the vehicle cargo area are avoided.

In some examples, activation of the second operating mode is not permitted while a telephony function is active. An advantage is that the vehicle is better equipped for tailgate events because the privacy of a call will not be interrupted by unintended activation of different loudspeakers.

In some examples, the control system is configured so that while the second operating mode is active, audio output through the loudspeaker system is controllable via a wireless communication interface. An advantage is that the vehicle is better equipped for tailgate events because the user does not have to re-enter the cabin to operate an infotainment interface.

In some examples, in the first operating mode, the control system is configured to deactivate the loudspeaker system in dependence on a powertrain of the vehicle entering the deactivated state, and the second operating mode is configured to enable the loudspeaker system to be used while the powertrain is in the deactivated state in dependence on monitored energy availability of a battery of the vehicle being greater than a depletion limit of the battery. In some examples, the depletion limit comprises an engine-start reserve of the battery. An advantage is that an auxiliary battery is not required and a starting-lighting-ignition battery (SLI battery) can be used.

In some examples, in the first operating mode the deactivation of the loudspeaker system (and other functions such as the wireless communication interface) is based on a timer configured to expire after the deactivated state has been entered. The timer may be paused in the second operating mode.

In some examples, the control system is configured to deactivate the second operating mode in dependence on a user deactivation request via an infotainment interface or personal hand-portable computing device. In some examples, the control system is configured to deactivate the second operating mode in dependence on engine-start. In some examples, the control system is configured to deactivate the second operating mode in dependence on satisfaction of a rear tailgate closure closed condition. An advantage is that the user has intuitive ways to resume a vehicle shutdown process and end their tailgate event experience. This reduces the chance that the second operating mode will be left on when it is no longer needed.

According to a further aspect of the invention there is provided a method comprising:

in a first operating mode, controlling a loudspeaker system of a vehicle to direct audio output into a cabin of the vehicle; and in a second, user-requestable operating mode, controlling the loudspeaker system of the vehicle to direct audio output to a vehicle-rearward location relative to the audio output in the first operating mode, wherein the second operating mode requires a rear tailgate closure of a rear cargo area of the vehicle to be opened.

According to further aspects of the invention there is provided a method and a control system for a vehicle. The control system comprises one or more controllers, wherein the control system is configured to perform the method comprising:

in a first operating mode, controlling a vehicle ancillary function of the vehicle to receive input from and/or provide output to a first device in a cabin of the vehicle; and in a second, user-requestable operating mode, controlling the vehicle ancillary function of the vehicle to receive input from and/or provide output to a second device at a vehicle-rearward location relative to first device, wherein the second operating mode requires a rear tailgate closure of a rear cargo area of the vehicle to be opened. The vehicle ancillary function can comprise, for example, a loudspeaker function and/or a microphone function. The first and second devices can comprise, for example, loudspeakers and/or microphones as described herein.

According to a further aspect of the invention there is provided a vehicle comprising the control system and loudspeaker system.

According to a further aspect of the invention there is provided computer software that, when executed, is arranged to perform any one or more of the methods described herein. According to a further aspect of the invention there is provided a non-transitory computer readable medium comprising computer readable instructions that, when executed by a processor, cause performance of any one or more of the methods described herein.

Within the scope of this application, it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 3A illustrates an example of a control system;

FIG. 3B illustrates an example of a non-transitory computer-readable storage medium;

FIG. 4 illustrates an example of a state diagram; and

DETAILED DESCRIPTION

Figure 1:
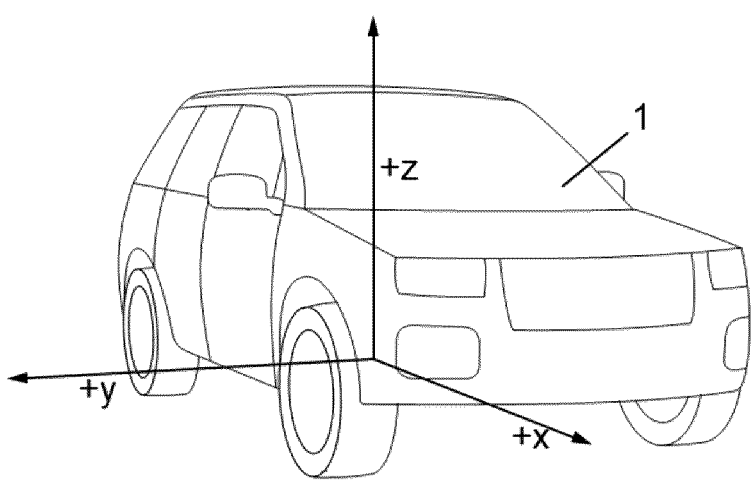
FIG. 1 illustrates an example of a vehicle.

FIG. 1 illustrates an example of a vehicle 1 in which embodiments of the invention can be implemented. In some, but not necessarily all examples, the vehicle 1 is a passenger vehicle, also referred to as a passenger car or as an automobile. In other examples, embodiments of the invention can be implemented for other applications, such as commercial vehicles.

Figure 2:
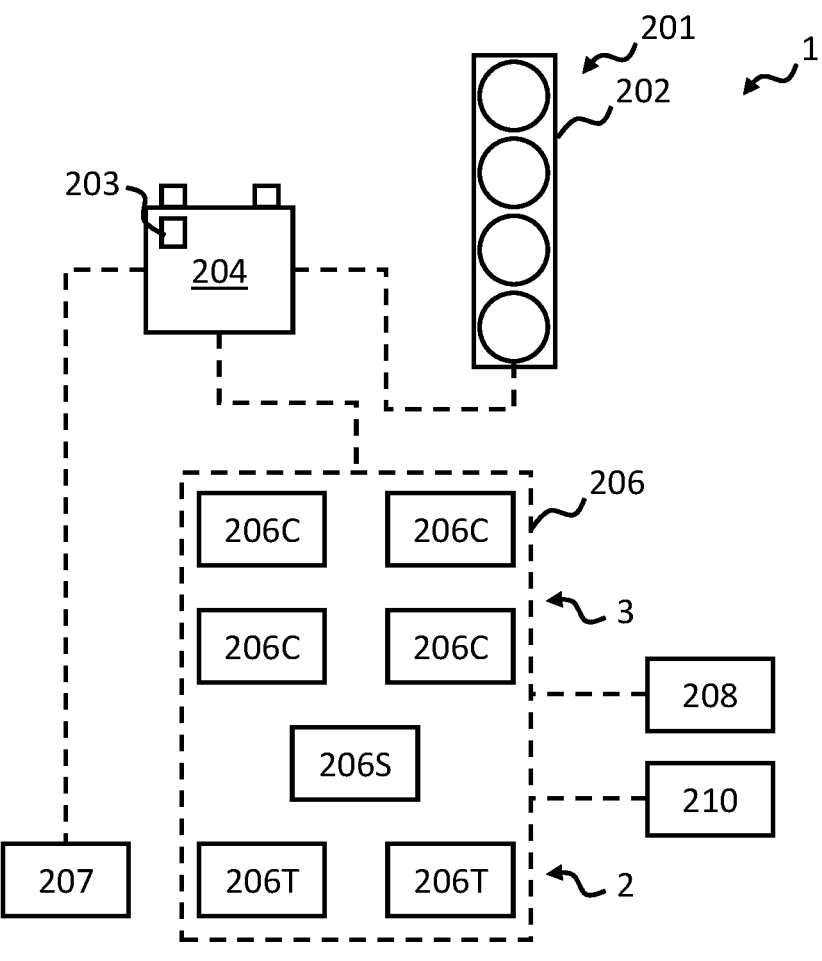
FIG. 2 illustrates an example of a system.

FIG. 2 schematically illustrates example features of the vehicle 1, that are referred to later.

FIG. 2 illustrates a battery 204 for the vehicle 1. In some implementations, a powertrain 201 of the vehicle 1 comprises an internal combustion engine 202 ('engine' herein) and the battery 204 comprises a starting-lighting-ignition battery (SLI battery) for starting the engine 202, the SLI battery comprising battery cells 203 and having a voltage of less than 60V or less than 30V or less than 15V. In other implementations, the vehicle 1 is a plug-in hybrid electric vehicle or a battery electric vehicle and the battery 204 is a traction battery.

FIG. 2 further illustrates a loudspeaker system 206 of the vehicle 1. The battery 204 is further configured to provide electrical power to the loudspeaker system 206. The illustrated loudspeaker system 206 comprises a set of loudspeakers around the interior of the vehicle 1, including forward loudspeakers 206C and rear loudspeakers 206S, 206T. The rear loudspeakers 206S, 206T are located within the rear cargo area 2 of the vehicle 1 or are otherwise configured to direct audio into the rear cargo area 2 of the vehicle 1.

Figure 5:
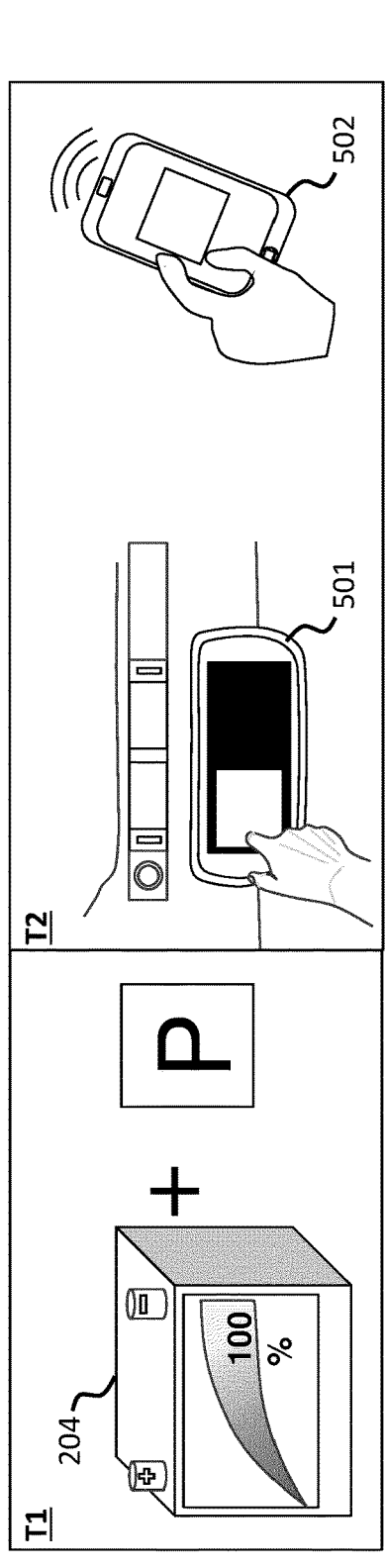
FIG. 5 illustrates an example storyboard.
Figure 5:
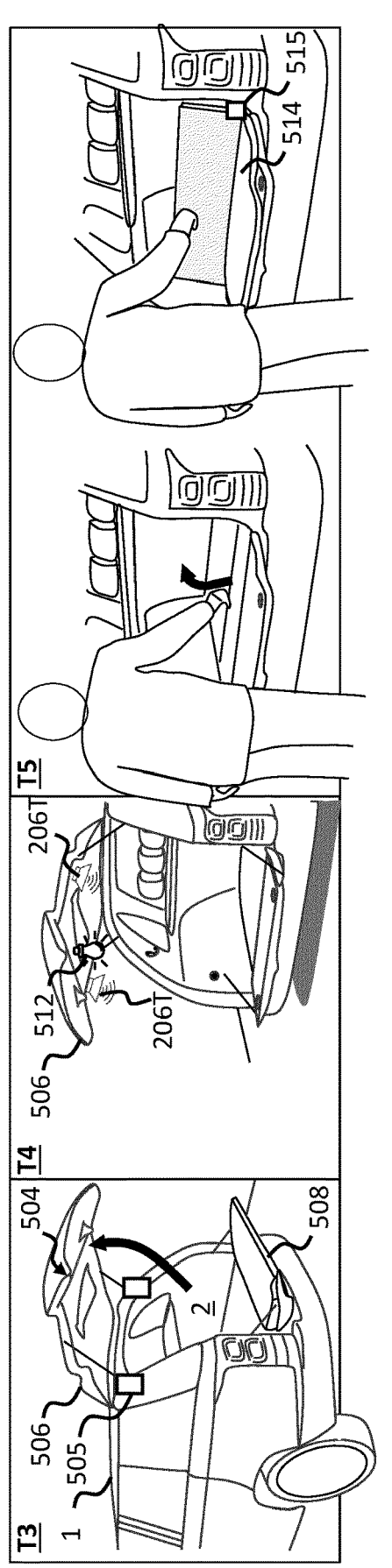

As shown in the example illustrated in FIG. 5, the rear loudspeakers 206T can comprise one or more rear tailgate closure loudspeakers 206T configured to be mounted to an interior side of a rear tailgate closure (FIG. 5, 506) of the vehicle 1. The rear tailgate closure loudspeakers 206T may be dedicated loudspeakers for use in tailgate events.

According to the example of FIG. 5, the rear tailgate closure loudspeakers 206T are provided on a tailgate closure of a split tailgate, such as on an upper tailgate closure 506. When the upper tailgate closure 506 is open, the rear tailgate closure loudspeakers 206T may face at least partially downwards to provide an unobstructed listening experience to a user sitting on a lower tailgate closure 508 of the split tailgate. When the upper tailgate closure 506 is closed, the rear tailgate closure loudspeakers 206T may face forward.

FIG. 2 further illustrates an optional subwoofer 206S, which may be located in or near the rear cargo area 2.

The forward loudspeakers 206C can comprise cabin area loudspeakers facing the cabin 3 of the vehicle 1. The term forward is used to identify loudspeakers that are used for presenting sound into the cabin area which is forward of the rear in a normal standing of the vehicle. Forward loudspeakers 206C may be mounted to side doors, to an A-pillar or B-pillar, or to a dashboard, for example.

As shown in FIG. 2, the vehicle 1 may further comprise a vehicle cabin microphone 208, operably coupled to the loudspeaker system 206 to enable a hands-free telephony function and/or a hands-free virtual assistant function. The vehicle cabin microphone 208 may be mounted in proximity to a front seat of the vehicle 1. For example, the vehicle cabin microphone 208 may be supported by the dashboard, an A-pillar or B-pillar, a seat structure or a steering wheel. In some examples, a further microphone 208 can be mounted in proximity to the rear cargo area 2.

As shown in FIG. 2, the vehicle 1 may further comprise a wireless communication interface 210. Audio output through the loudspeaker system 206 may be controllable via the wireless communication interface 210. The wireless communication interface 210 can comprise a short range wireless personal/local area network interface (e.g., Bluetooth™/WiFi™ interface) able to play audio from a user's mobile equipment (FIG. 5, 502) through the loudspeaker system 206. This enables a user to control audio during a tailgate event without having to climb back into the cabin 3 to operate an integrated infotainment system of the vehicle 1.

In addition to the loudspeaker system 206, FIG. 2 further illustrates an optional electrical receptacle 207 of the vehicle 1. In some implementations, the battery 204 is configured to provide electrical power for auxiliary equipment during a tailgate event by providing electrical power to the electrical receptacle 207. In some examples, the electrical receptacle 207 is located in or near the rear cargo area 2 of the vehicle 1.

FIG. 5 illustrates further optional features not shown in FIG. 2, for enhancing a tailgate event. FIG. 5 illustrates a rear cargo area lamp 512 that is activatable to function as a task lamp for illuminating an area in the vicinity of the rear cargo area 2. In some examples, the rear cargo area lamp 512 is integrated with the rear tailgate closure such as the upper tailgate closure 506. Therefore, when the upper tailgate closure 506 is open, a user sitting on the lower tailgate closure 508 has the benefit of an overhead task lamp.

FIG. 5 further illustrates a tailgate seat 514 supported at least partially by the lower tailgate closure 508. The tailgate seat 514 may comprise a seat base and a seat back. The seat base and/or seat back may be integrated with the rear cargo area 2 or may be a separate part that is attached when needed to a suitable attachment point 515 of the vehicle 1.

As demonstrated above, the vehicle 1 is well-equipped to cater for a tailgate party. According to a control method 400 described below and shown in FIG. 4, the vehicle 1 is switchable between different operating modes including an operating mode configured for a tailgate event.

First, an example of a suitable control system 300 for carrying out the control method 400 is shown in FIG. 3A and described. The control system 300 comprises at least one controller 301. The controller 301 of FIG. 3A includes at least one processor 304; and at least one memory device 306 electrically coupled to the electronic processor 304 and having instructions 308 (e.g., a computer program) stored therein, the at least one memory device 306 and the instructions 308 configured to, with the at least one processor 304, cause any one or more of the methods described herein to be performed. The processor 304 may have an interface 302 such as an electrical input/output I/O or electrical input for receiving information and interacting with external components. FIG. 3B illustrates a non-transitory computer-readable storage medium 330 comprising the instructions 308 (computer software).

FIG. 4 is an example state diagram illustrating the method 400 performed by the control system 300. The state diagram is configured to switch between the first operating mode 401 and the second operating mode 402 based on conditions 404, 406.

The first operating mode 401 may be a normal or default operating mode for the loudspeaker system 206. The second operating mode 402 may be a user-requestable operating mode for extended use of the loudspeaker system 206 during a tailgate event, while the vehicle 1 is not running.

In the first operating mode 401, the control system 300 is configured to control the loudspeaker system 206 of the vehicle 1 to direct audio output into the cabin 3 of the vehicle 1. The first operating mode 401 is used for normal driving. For example, audio may be output through the forward loudspeakers 206C but not the rear tailgate closure loudspeakers 206T. The rear tailgate closure loudspeakers 206T may be inactive (substantially no audio output) to reduce energy use, as their sound may be muffled to those in the cabin 3. Alternatively, all of the loudspeakers of FIG. 2 may be active and the audio may be faded towards a default front-rear position configured for listening in the cabin 3.

If the user parks the vehicle 1 and deactivates the powertrain 201 of the vehicle 1 and does not wish to have a tailgate event, they will leave the control system 300 in the first operating mode 401. In this situation, the control system 300 may deactivate equipment such as the loudspeaker system 206, the electrical receptacle 207, and/or the wireless communication interface 210 as part of a vehicle 1 shutdown process. They are deactivated immediately or not long after the control system 300 detects that the powertrain 201 of the vehicle 1 has entered a deactivated state. Detecting the deactivated state can comprise any appropriate detection that the vehicle 1 has been switched off such that the powertrain 201 is not operable to drive the vehicle 1, meaning that any torque demand (e.g., accelerator pedal depression) would not be acted upon. For example, the control system 300 may detect a vehicle-off power mode or similar 'key-off' event.

In the first operating mode 401, deactivation of the loudspeaker system 206 after the deactivation of the powertrain 201 can be controlled by a timer, in some examples. The timer may initiate automatically in dependence on the detection of the deactivated state. The expiry duration of the timer depends on the implementation, but could be less than ten minutes or less than five minutes to minimise power drain.

If the user instead wishes to have a tailgate event experience, they may request the second operating mode 402. In the second operating mode 402, the control system 300 is configured, among other things, to control the loudspeaker system 206 of the vehicle 1 to direct audio output to a vehicle-rearward location relative to the audio output in the first operating mode 401, to improve the tailgate listening experience in a tailgate listening zone. For example the rear tailgate closure loudspeakers 206T may be activated if previously not active. If the rear tailgate closure loudspeakers 206T were already active, their sound pressure levels may be increased by fading the audio output towards the rear cargo area 2. The subwoofer 206S may remain active.

In order to prevent the loudspeaker system 206 from deactivating when the powertrain 201 enters the deactivated state, the control system 300 may ignore or interrupt (e.g., pause) the timer if the second operating mode 402 has been entered.

In the second operating mode 402, the loudspeaker system 206 may be available for longer than an hour while the powertrain 201 is off, assuming the battery 204 is initially fully charged. For hybrid vehicle traction batteries, the duration may be significantly longer. The control system 300 may deactivate at least some of the forward loudspeakers 206C in the second operating mode 402 to prolong battery life, as their sound may be muffled to those at the rear cargo area 2.

With the powertrain 201 off in the second operating mode 402, the wireless communication interface 210, if present, may also remain active so that the user does not have to climb back into the cabin 3 to control audio settings or playback. The electrical receptacle 207, if present, may also remain active.

The second operating mode 402 requires the rear tailgate closure to be opened. For example, in response to activation of the second operating mode 402, the control system 300 may be configured to output a control signal to cause a rear tailgate power mechanism 505 to open the rear tailgate closure. If the vehicle 1 lacks a rear tailgate power mechanism 505 or said mechanism 505 is signalled as faulty, the control system 300 may cause output of an audible and/or visual user prompt to request the user to open the rear tailgate closure manually. In a split tailgate implementation, the second operating mode 402 may require either one or both of the upper tailgate closure 506 and the lower tailgate closure 508 to be open.

For a split tailgate, the second operating mode 402 may cause or require the upper tailgate closure 506 to be opened to at least a minimum or predetermined opening angle. The opening angle is such that a user can sit on the edge of the rear cargo area 2 with clearance above their head. A tailgate opening position sensor may be provided to indicate how open the upper tailgate closure 506 is. A collision proximity sensor may be provided to detect if the upper tailgate closure 506 is about to collide with an object. If a potential collision indicated by the collision proximity sensor would prevent the opening angle from being reached, the second operating mode 402 may transition back to the first operating mode 401 or the user may be otherwise alerted to move their vehicle 1 to an area with more headroom.

Another useful tailgate event feature is for hands-free telephony to be automatically disabled in the second operating mode 402 despite wireless audio being available, so that an incoming call or notification does not interrupt the playback of music/audio. Access to the loudspeaker system 206 by a telephony function is inhibited in the second operating mode 402. Access to the vehicle cabin microphone 208 by the telephony function may be inhibited in the second operating mode 402.

Another useful tailgate event feature is for a hands-free powered tailgate request function (gesture tailgate function) to be automatically disabled in the second operating mode 402. A hands-free powered tailgate request function is a function that is configured to initiate powered closing and/or opening of one or more rear tailgate closures by a powered tailgate system in dependence on a detected hands-free user action, such as a gesture and/or voice command. Inhibiting the function in the second operating mode 402 enables users sitting on the edge of the rear cargo area 2 to tuck their feet under the rear bumper of the vehicle 1 without triggering a tailgate close command from a bumper-mounted sensor.

Another useful tailgate event feature is for at least part of a proximity-based vehicle locking function (walkaway locking function) to be automatically disabled in the second operating mode 402, so that users can walk away from the vehicle 1 without an audible sound (e.g., chime) being rendered. The function of the audible sound may be to act as a warning that is rendered via a loudspeaker(s) 206 when a device of the user is detected to be away from the vehicle 1 if a closure of the vehicle 1 is detected as open (such as the tailgate).

Another useful tailgate event feature is for a rear microphone 208 to be automatically enabled in the second operating mode 402 to enable the hands-free virtual assistant function to more reliably recognise voice commands from users at the rear cargo area 2. The rear microphone 208 may be rearward of the front seat vehicle cabin microphone 208 and may be proximal to the rear cargo area 2.

FIG. 4 illustrates an entry condition 404 for transitioning from the first operating mode 401 to the second operating mode 402. The entry condition 404 may comprise a user entry condition. That is, the second operating mode 402 may be a user-requestable operating mode, requestable whenever the user wants the tailgate event experience. For example, the user may be able to request the second operating mode 402 via any appropriate human-machine interface, such as a touchscreen (FIG. 5, 501) or tactile input device of the vehicle 1 or an app on their personal hand-portable computing device (FIG. 5, 502). In some examples, the user is able to request the second operating mode 402 if various preconditions of the entry condition 404 are satisfied. A precondition can comprise the vehicle 1 being parked and secured. The control system 300 could monitor this precondition based on a parking brake status, a park pawl status, the powertrain 201 being in the deactivated state, or a combination thereof. Another precondition may be that there is no ongoing hands-free telephony event utilizing the loudspeaker system 206. In some examples, another precondition is that the battery 204 has an above-threshold state of charge.

FIG. 4 also illustrates the exit condition 406 for transitioning from the second operating mode 402 to the first operating mode 401. Various example events satisfying the exit condition 406 are described below. In some examples, the exit condition 406 can be satisfied if a precondition of the entry condition 404 is no longer being satisfied, such as the user activating the powertrain 201 or at least the engine 202, or the parking brake and/or park pawl being released, or a combination thereof. In some examples, the exit condition 406 can be satisfied by a user request to transition to the first operating mode 401, via a human-machine interface such as a touchscreen (FIG. 5, 501) or tactile input device of the vehicle 1 or an app on their personal hand-portable computing device (FIG. 5, 502). In some examples, the exit condition 406 can be satisfied by detecting closing of a rear tailgate closure.

The exit condition 406 can comprise an energy use precondition in order to prevent the battery 204 from being drained excessively. The control system 300 monitors the energy use precondition to determine when to transition back to the first operating mode 401 (e.g., un-pause the timer to resume shutdown). The control system 300 enables the second operating mode 402 as long as a monitored energy availability of the battery 204 is greater than a depletion limit of the battery 204. Assuming the battery 204 was initially charged, this should provide a much longer duration of use of the loudspeaker system 206 and other electrical features than would be permitted by the timer.

In an example implementation, the monitored energy availability of the battery 204 comprises a state of charge. The depletion limit of the battery 204 comprises a minimum threshold state of charge for providing an engine-start reserve. Note that in this example, the control system 300 does not automatically start the engine 202 to generate power in response to the depletion limit being reached, to prevent emissions in the vicinity of the rear cargo area 2. Instead, the engine-start reserve is a state of charge that is calibrated to be enough to enable user-requested engine start after a long stand-time. The depletion limit may be calibrated to be at a high enough level to enable the engine 202 to be reliably started in a wide range of climactic conditions after a minimum stand time (e.g., longer than seven days).

The depletion limit of the battery 204 may be variable rather than static, and based on one or more monitored variable parameters. The depletion limit may track the health or condition of the battery 204. For example, the depletion limit may be configured to rise in dependence on at least one of: monitored capacity of the battery 204 falling; monitored internal resistance of the battery 204 rising; monitored temperature of the battery 204 being below a cold temperature threshold; or monitored temperature of the battery 204 being above a hot temperature threshold. If the battery 204 is brand new/at an optimal temperature, for example, the depletion limit could be as low as 30% state of charge, or some other value less than 45%. This is because the new battery cells 203 are able to supply a reliable engine start voltage during engine start (cranking), even with a low state of charge. If the battery 204 is aged/at a suboptimal temperature, the depletion limit could be higher than 55% and may be higher than 75%. This is because the aged battery cells 203 need to be at a higher state of charge in order to supply a reliable engine start voltage.

FIG. 5 is a storyboard illustrating an example non-limiting implementation of the control methods described herein. Five panels illustrate five steps/times T1-T5.

Panel T1 of FIG. 5 figuratively illustrates some example requirements for the second operating mode 402 of FIG. 4. A first requirement is that the battery 204 has a state of charge above a threshold. A second requirement is that the vehicle 1 is parked and secured as described earlier. A further requirement may be that there is no ongoing hands-free telephony event utilizing the loudspeaker system 206. Non-satisfaction of any one of these requirements may cause the second operating mode 402 to be non-activatable or to transition back to the first operating mode 401.

Panel T2 figuratively illustrates how a user may request the second operating mode 402. For example, the option to activate the second operating mode 402 may be a menu item in a touchscreen display 501 of a centre console or instrument cluster. Additionally, or alternatively, the second operating mode 402 can be requested wirelessly from a user's mobile equipment 502 such as via a mobile phone app.

Panel T3 figuratively illustrates how the second operating mode 402 may require a rear tailgate 504 of a rear cargo area 2 of the vehicle 1 to be opened. For example, if the rear tailgate 504 is a powered tailgate, the control system 300 may cause a rear tailgate power mechanism 505 to open the rear tailgate 504 automatically when the second operating mode 402 is initiated. Alternatively, if the rear tailgate 504 is unpowered, the user may be directed to open the rear tailgate 504, for example via a displayed instruction. In the illustrated example, the tailgate 504 is a split tailgate comprising an upper tailgate closure 506 and a lower tailgate closure 508, one or both of which may be powered. The lower tailgate closure 508 may be configured to fold down so that a user can sit on the lower tailgate closure 508 or on a tailgate seat 514 supported at least partially by the lower tailgate closure 508.

Panel T4 figuratively illustrates useful tailgate event functions of the second operating mode 402. One or more rear tailgate closure loudspeakers 206T may be kept active despite the powertrain 201 being in the deactivated state. Cabin-mounted loudspeakers such as forward loudspeakers 206C may be deactivated to preserve battery life, since they are not necessarily needed in a tailgate event. The rear cargo area lamp 512 is also shown, for the user's convenience. Other features described earlier but not visible in FIG. 5 may be present.

Panel T5 figuratively illustrates the user deploying an optional tailgate seat 514 such as a deployable seat base and/or deployable seat back for one or more users, to allow the user to comfortably sit in the rear cargo area 2 of the vehicle 1 while enjoying their tailgate event. The tailgate seat 514 may be attachable to one or more attachment points 515 or may be an integrated feature of the rear cargo area 2.

When the user is finished with their tailgate event, they may initiate deactivation of the second operating mode 402 as described earlier.

It will be appreciated that various changes and modifications can be made to the present invention without departing from the scope of the present application.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a vehicle, the control system comprising one or more controllers, wherein the control system is configured to:

in a first operating mode, control a loudspeaker system of the vehicle to direct audio output into a cabin of the vehicle; and in a second, user-requestable operating mode, control the loudspeaker system of the vehicle to direct audio output to a vehicle-rearward location relative to the audio output in the first operating mode, wherein the second operating mode requires a rear tailgate closure of a rear cargo area of the vehicle to be opened, wherein, in the first operating mode, one or more functions are enabled and, in the second operating mode, the one or more functions are inhibited, wherein the one or more functions include at least one of:

access to the loudspeaker system by a telephony function;

access to a vehicle cabin microphone by the telephony function;

a hands-free powered tailgate request function; and a proximity-based vehicle locking function.

2. The control system of claim 1, wherein directing audio output in the vehicle-rearward location comprises activating or increasing a sound pressure level of a rear loudspeaker of the loudspeaker system.

3. The control system of claim 2, wherein directing audio output to the vehicle-rearward location comprises activating the rear loudspeaker and wherein the rear loudspeaker is inactive in the first operating mode.

4. The control system of claim 1, configured to, in response to activation of the second operating mode, output a control signal to cause a rear tailgate power mechanism to open the rear tailgate closure, or cause output of a user prompt to request the user to open the rear tailgate closure.

5. The control system of claim 1, wherein in the first operating mode, access to the loudspeaker system by a telephony function is enabled and in the second operating mode access to the loudspeaker system by the telephony function is inhibited.

6. The control system of claim 1, wherein in the first operating mode a hands-free powered tailgate request function is enabled and in the second operating mode the hands-free powered tailgate request function is inhibited.

7. The control system of claim 1, wherein in the first operating mode a proximity-based vehicle locking function is enabled and in the second operating mode at least part of the proximity-based vehicle locking function is inhibited.

8. The control system of claim 1, configured to activate the second operating mode in dependence on a user activation request via an infotainment interface or personal hand-portable computing device.

9. The control system of claim 1, wherein activation of the second operating mode is not permitted while a telephony function is active.

10. The control system of claim 1, wherein in the first operating mode, the control system is configured to deactivate the loudspeaker system in dependence on a powertrain of the vehicle entering a deactivated state, and wherein the second operating mode is configured to enable the loudspeaker system to be used while the powertrain is in the deactivated state in dependence on monitored energy availability of a battery of the vehicle being greater than a depletion limit of the battery.

11. The control system of claim 10, wherein the depletion limit comprises an engine-start reserve of the battery, and/or wherein the control system is configured to deactivate the second operating mode in dependence on the monitored energy availability of the battery reaching the depletion limit, without causing engine start to generate additional energy to further extend the second operating mode.

12. The control system of claim 1, configured to deactivate the second operating mode in dependence on at least one of:

a user deactivation request via an infotainment interface or personal hand-portable computing device;

engine-start; and satisfaction of a rear tailgate closure closed condition.

13. A vehicle comprising a control system, a cabin, a loudspeaker system, and a rear cargo area having a rear tailgate closure, the control system comprising one or more controllers, wherein the control system is configured to:

in a first operating mode, control the loudspeaker system of the vehicle to direct audio output into the cabin of the vehicle; and in a second, user-requestable operating mode, control the loudspeaker system of the vehicle to direct audio output to a vehicle-rearward location relative to the audio output in the first operating mode, wherein the second operating mode requires the rear tailgate closure of the rear cargo area of the vehicle to be opened, wherein, in the first operating mode, one or more functions are enabled and, in the second operating mode, the one or more functions are inhibited, wherein the one or more functions include at least one of:

access to the loudspeaker system by a telephony function;

access to a vehicle cabin microphone by the telephony function;

a hands-free powered tailgate request function; and a proximity-based vehicle locking function.

14. A method comprising:

in a first operating mode, controlling a loudspeaker system of a vehicle to direct audio output into a cabin of the vehicle; and in a second, user-requestable operating mode, controlling the loudspeaker system of the vehicle to direct audio output to a vehicle-rearward location relative to the audio output in the first operating mode, wherein the second operating mode requires a rear tailgate closure of a rear cargo area of the vehicle to be opened, wherein, in the first operating mode, one or more functions are enabled and, in the second operating mode, the one or more functions are inhibited, wherein the one or more functions include at least one of:

access to the loudspeaker system by a telephony function;

access to a vehicle cabin microphone by the telephony function;

a hands-free powered tailgate request function; and a proximity-based vehicle locking function.

15. A non-transitory, computer-readable medium having stored thereon computer software that, when executed by an electronic processor, is arranged to perform the method according to claim 14.

16. The control system of claim 2, wherein the rear loudspeaker is a rear tailgate closure loudspeaker configured to be mounted to an interior side of the rear tailgate closure.

17. The control system of claim 1, wherein directing audio output to the vehicle-rearward location comprises deactivating or decreasing a sound pressure level of a forward loudspeaker that is facing the cabin of the vehicle and/or that is in a front area of the cabin.

18. The control system of claim 1, wherein in the first operating mode, access to a vehicle cabin microphone by the telephony function is enabled and in the second operating mode access to the vehicle cabin microphone by the telephony function is inhibited.

19. The control system of claim 1, wherein the second operating mode is permitted when an internal combustion engine of the vehicle is inactive but not when the internal combustion engine is active.

20. The control system of claim 10, wherein in the first operating mode, the deactivation of the loudspeaker system is based on a timer configured to expire after the deactivated state has been entered.

* * * * *